United States Patent
Hatfield et al.

(10) Patent No.: US 11,550,889 B2
(45) Date of Patent: Jan. 10, 2023

(54) DEVICE FUNCTIONALITY MANAGEMENT VIA FACE SCANNING

(71) Applicant: International Business Machines Corporation, Armonk, NY (US)

(72) Inventors: Jennifer M. Hatfield, San Francisco, CA (US); Craig M. Trim, Ventura, CA (US); Martin G. Keen, Cary, NC (US); Michael Bender, Rye Brook, NY (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 16/931,058

(22) Filed: Jul. 16, 2020

(65) Prior Publication Data

US 2022/0019648 A1    Jan. 20, 2022

(51) Int. Cl.
```
G06F 21/00    (2013.01)
G06F 21/32    (2013.01)
G06K 9/62     (2022.01)
G06V 40/16    (2022.01)
```

(52) U.S. Cl.
CPC ........... *G06F 21/32* (2013.01); *G06K 9/6201* (2013.01); *G06V 40/174* (2022.01)

(58) Field of Classification Search
CPC ....... G06F 21/32; G06F 21/31; G06K 9/6201; G06V 40/174; G06V 40/172; G06V 40/176

See application file for complete search history.

(56) References Cited

U.S. PATENT DOCUMENTS

| | | | |
|---|---|---|---|
| 7,898,385 B2 | 3/2011 | Kocher | |
| 8,447,273 B1 | 5/2013 | Friedlander | |
| 9,652,663 B2 | 5/2017 | Lau | |
| 10,320,799 B2 | 6/2019 | Arcese | |
| 10,496,163 B2 | 12/2019 | Siddiqui | |
| 2004/0109588 A1 | 6/2004 | Houvener | |
| 2014/0373114 A1 | 12/2014 | Franca-Neto | |
| 2018/0196969 A1* | 7/2018 | Herger | G06V 40/174 |
| 2018/0247037 A1 | 8/2018 | Weller | |
| 2019/0147152 A1* | 5/2019 | Kurian | G06V 40/174 382/118 |

(Continued)

FOREIGN PATENT DOCUMENTS

| | | |
|---|---|---|
| CN | 105874474 A | 8/2016 |
| EP | 2083399 A1 | 3/2016 |

OTHER PUBLICATIONS

Cipriani, "iPhone Face ID is pretty cool. Here's how it works and how to use it," CNET, Feb. 5, 2020, 6 pags. <https://www.cnet.com/how-to/the-iphone-and-ipads-face-id-tech-is-pretty-darn-cool-heres-how-it-works-and-how-to-use-it/>.

(Continued)

*Primary Examiner* — Jeffrey C Pwu
*Assistant Examiner* — William A Corum, Jr.
(74) *Attorney, Agent, or Firm* — Brian D. Welle

(57) ABSTRACT

Facial scanning data of an authorized user is received for requested access to a computing device. A facial expression of the facial scanning data is determined to match a predetermined facial expression. In response to identifying that the facial expression matches the predetermined facial expression, the computing device is caused to provide a set of functionality that correlates to the predetermined facial expression.

9 Claims, 4 Drawing Sheets

(56) References Cited

U.S. PATENT DOCUMENTS

2019/0147676 A1    5/2019  Madzhunkov
2020/0082064 A1*   3/2020  Kurian
2020/0238952 A1*   7/2020  Lindsay .................. B60R 21/01
2020/0380099 A1*  12/2020  Ridgill, II ............... G06F 21/31

OTHER PUBLICATIONS

Peter et al., "Improving ATM Security via Face Recognition," 3rd International Conference on Electronics Computer Technology 2011, Apr. 8-10, 2011, pp. 373-376.

Xie, "Facial movement based human user authentication," Iowa State University Graduate Theses and Dissertations, 2014, 60 pages. <https://lib.dr.iastate.edu/cgi/viewcontent.cgi?article=5274&context=etd&usg=AOwVaw3_TNSaYw0DIPFse41DbxSr>.

Yin et al. "Fusion of face recognition and facial expression detection for authentication: a proposed model," Proceedings of the 11th International Conference on Ubiquitous Information Management and Communication, Jan. 2017, 8 pages.

\* cited by examiner

DEVICE FUNCTIONALITY MANAGEMENT VIA FACE SCANNING

BACKGROUND

As mobile computing devices become more common and attacks upon these mobile devices become more prevalent, there is an increased desire to improve security for these devices. While historically devices were predominantly protected with a single password or the like, there is an increased desire to use more modern technology and more advanced techniques to improve security. For example, the use of fingerprint scanners, facial scanners, two-factor identification (e.g., both a password and a face scan), or the like is increasing in use. While devices often include specific tools for scanning fingerprints, these same devices may use a generic use camera of the device to execute a facial scan. This may enable devices to execute a facial scan quickly and conveniently without drawing attention to the user.

SUMMARY

Aspects of the present disclosure relate to a method, system, and computer program product relating to managing the functionality of a user device via face scanning. For example, the method includes receiving first facial scanning data of a user regarding a first requested access to a computing device. The method further includes identifying that a first facial expression of the first facial data matches a first predetermined facial expression. The method further includes causing the computing device to provide a first set of functionality in response to identifying that the first facial expression matches the first predetermined facial expression. The method further includes receiving second facial scanning data of the user regarding a second requested access to the computing device. The method further includes identifying that a second facial expression of the second facial data matches a second predetermined facial expression. The method further includes causing the computing device to provide a second set of functionality in response to identifying that the second facial expression matches the second predetermined facial expression. A system and computer product configured to perform the above method are also disclosed.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
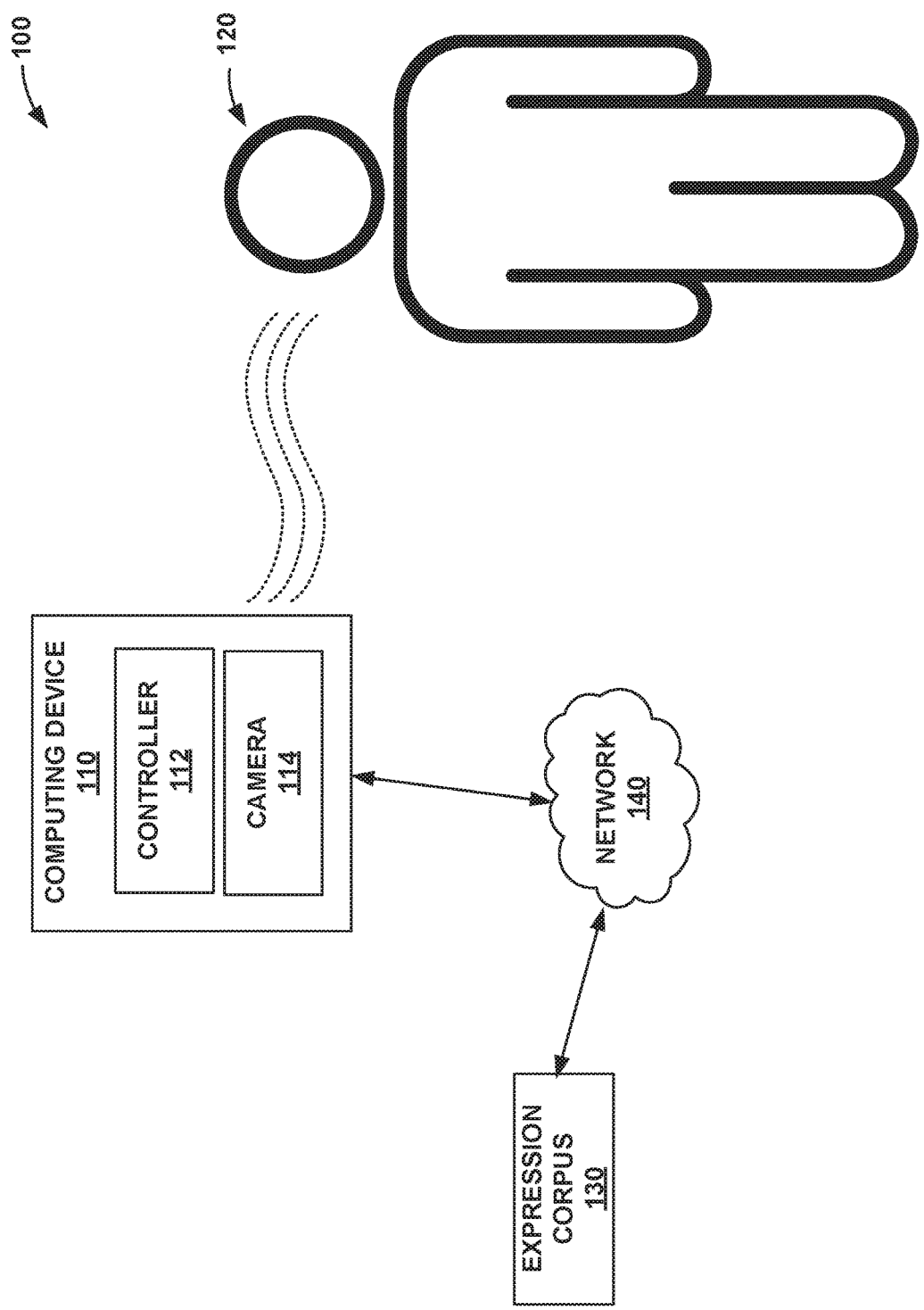
FIG. 1 depicts a conceptual diagram of an example system in which a controller may manage functionality of a computing device via facial scanning data regarding a user received from a scanning device.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to managing functionality of a computing device via facial scanning, while more particular aspects of the present disclosure relate to offering different and/or reduced functionality in response to detecting that the user is generating predetermined facial expressions or certain emotions. While the present disclosure is not necessarily limited to such applications, various aspects of the disclosure may be appreciated through a discussion of various examples using this context.

The use of facial scanners to unlock computing devices is increasing across a wide variety of computing device such as smart phones, laptops, tablets, or the like. Many conventional computing devices are configured to execute a facial scanner extremely quickly, such as with only a single clear frame or two of a face of an authorized user. As used herein, an authorized user includes users who have primary ownership of a computing device and/or whose face is set up to unlock a computing device (e.g., in addition to having knowledge of passwords that can unlock the computing device, and/or whose finger is also set up to unlock a computing device).

While facial scanning has increased an ease in which an authorized user may unlock their computing devices, it has also had the unintended consequence of making it easier for malicious third parties to gain illegitimate access to computing devices. As used herein, malicious third parties may refer to a person who is seeking access to a computing device and who does not have the knowledge and/or ability to unlock the computing device with a password, keyword, pass phrase, their own finger, their own face, or the like. For example, malicious third parties may be able to unlock computing devices that are configured for facial scanning by illicitly gaining physical possession of these computing devices, turning on a facial scanning mode, and then causing an authorized user to look at such computing devices (such that the computing devices captures an acceptable image of the authorized user, therein unlocking the computing devices that are currently possessed by the malicious third party).

Some conventional computing devices may seek to improve upon this situation by detecting that the authorized user is assuming a secondary expression, in response to which the conventional device determines to not unlock the conventional computing devices, or to turn off the computing device, or the like. Put differently, conventional computing devices may be configured to execute a binary decision in which the conventional computing device is either unlocked to normal functionality in response to a facial scan that identifies a "normal" expression or turned off/not unlocked/etc. when these conventional computing systems detect that an authorized user is making this secondary expression (e.g., a look of panic, or a predetermined atypical expression). While such functionality may be effective in stopping a current attempt to unlock the conventional computing device, the malicious third party would immediately become aware that the unlock attempt has failed. As such, in some cases, the malicious third party may escalate efforts to attempt to get the authorized user to provide a "normal" look to get such a conventional computing device to unlock. Prolonging interaction with these malicious third parties in this way may be an undesired side effect of authorized users using such conventional computing device.

Certain conventional computing devices may take this even further by destroying some or all data or functionality of the conventional computing devices in response to detecting such a secondary expression. While this may foil the efforts of a malicious third party to gain illegitimate access to the conventional computing device, it may also cause the permanent loss of any data saved to the conventional computing device. Also, such functionality may invite the possibility that the authorized user may accidentally assume the secondary expression and cause the permanent deletion or destruction of some data and/or functionality of the conventional computing device even when no malicious third party was involved in the attempt to access the computing device.

Aspects of this disclosure may solve or otherwise address some or all of these problems. For example, aspects of this disclosure are related to causing a computing device to provide different sets of actual unlocked functionality in response to different predetermined facial expressions and/or certain emotions of an authorized user. As used herein, a functionality of a computing device as modified in response to different facial expressions and/or emotions may include anything that a computing device is capable of doing either autonomously (e.g., backing up data) or in response to a command from an authorized user (e.g., sending a message, hiding an application, presenting an application, or other such functions described herein). The authorized user may be select which predetermined facial expressions and/or emotions provide what functionality, giving the authorized user more ability to shape interactions with malicious third parties (and also providing more immediate ability to navigate safely through the mobile device).

One or more computing components (these computing components including or otherwise making using of a processing unit executing instructions stored on a memory) may provide this functionality, these one or more computing components hereinafter referred to collectively as a controller. This controller may be integrated into (e.g., downloaded onto) the computing device as predominantly described below for purposes of clarity, though in other examples the controller may be hosted on a standalone computing device and accessed over a network or the like.

Providing such a controller may improve an ability for a computing device to ward off attempts of a malicious third party to illicitly access a computing device, and only provide access in response to authorized users. Further, a controller as described herein may be configured to enable a computing device to be unlocked quickly and conveniently by an authorized user so that a benign third party (e.g., a child of the authorized user, a friend of the authorized user, or the like) may be given a predetermined amount of access and functionality (e.g., where such access and functionality is relatively less than a full of access and functionality) of the computing device. Enabling a computing device to do so quickly in predetermined manners in response to predetermined facial expressions and detected emotions may improve a security of data of the computing device, among other advantages that are evident to one of ordinary skill in the art.

For example, FIG. 1 depicts environment 100 in which controller 112 is integrated into computing device 110 of authorized user 120. Computing device 110 may be similar to the computing system 200 of FIG. 3 that includes a processor communicatively coupled to a memory that includes instructions that, when executed by the processor, causes controller 112 to execute one or more operations described below. Though computing device 110 is depicted and discussed predominantly as a mobile phone, computing device 110 may be any device that may be unlocked via facial scanning techniques.

Though a single authorized user 120 is depicted in FIG. 1 for purposes of illustration, in some examples multiple authorized users 120 may exist for a single computing device 110. Where there are multiple authorized users 120 associated with a single computing device 110, each of these multiple authorized users 120 may be associated with a plurality of different facial expressions that, when detected by controller 112, cause controller 112 to itself cause computing device 110 to provide different respective sets of functionality.

Computing device 110 may be configured to unlock when computing device 110 receives real-time images of a face of authorized user 120. As depicted in FIG. 1, computing device 110 may include camera 114 that captures images and/or a video feed of a face of authorized user 120. Alternatively, or additionally, camera 114 may be a separate physical device from computing device 110 (e.g., a webcam or the like) that is configured to gather images of authorized user 120 and send these images to (and/or have these images gathered by) computing device 110. The image data of the face of authorized user 120 is referred to as facial scanning data herein.

Once received by computing device 110, controller 112 may analyze the facial scanning data. Controller 112 may analyze facial scanning data to determine whether or not the facial scanning data matches one or more emotions and/or facial expressions of authorized user 120. Controller 112 may match facial scanning data to emotions and/or expressions using any facial recognition techniques known in the art.

Controller 112 may compare the facial scanning data against expressions saved within expression corpus 130. Expression corpus 130 may include a plurality of expressions of one or more authorized users 120, each of which may be associated with a different set of functionality of computing device 110. Though in some examples expression corpus 130 may be incorporated into a memory of computing device 110, FIG. 1 depicts expression corpus 130 as remotely stored in a separate computing device (where this separate computing device may be similar to computing system of FIG. 3), such as a server or the like.

Each expression within expression corpus 130 may be saved in any number of ways. For example, each expression may be a pixel-to-pixel comparison between a determined baseline and an immediate image from facial scanning data. Alternatively, or additionally, controller 112 may be configured to identify primary features of a face of authorized user 120, such that each facial expression is reduced down to various relationships between relative sizes, shapes, and/or distances between facial features such as a nose, eyes, eyebrows, cheekbones, chin, mouth, etc. In some examples, controller 112 may ignore pixels that are associated with makeup, face imperfections, or the like, to disregard temporary marks upon the face of authorized user 120. Controller 112 may regularly verify that a stored baseline of expressions of authorized user 120 are still accurate, or whether one or more expressions have changed by some amount (e.g., by a virtue of authorized user 120 getting older, styling eyebrows differently, or the like).

Computing device 110 and expression corpus 130 may communicate over network 140. Network 140 may include a computing network over which computing messages may be sent and/or received. For example, network 140 may include the Internet, a local area network (LAN), a wide area network (WAN), a wireless network such as a wireless LAN (WLAN), or the like. Network 140 may comprise copper transmission cables, optical transmission fibers, wireless transmission, routers, firewalls, switches, gateway computers and/or edge servers. A network adapter card or network interface in each computing/processing device (e.g., computing device 110 and/or expression corpus 130) may receive messages and/or instructions from and/or through network 140 and forward the messages and/or instructions for storage or execution or the like to a respective memory or processor of the respective computing/processing device. Though network 140 is depicted as a single entity in FIG. 1 for purposes of illustration, in other examples network 140 may include a plurality of private and/or public networks over which controller 112 may manage computing device 110 functionality as described herein.

Figure 2:
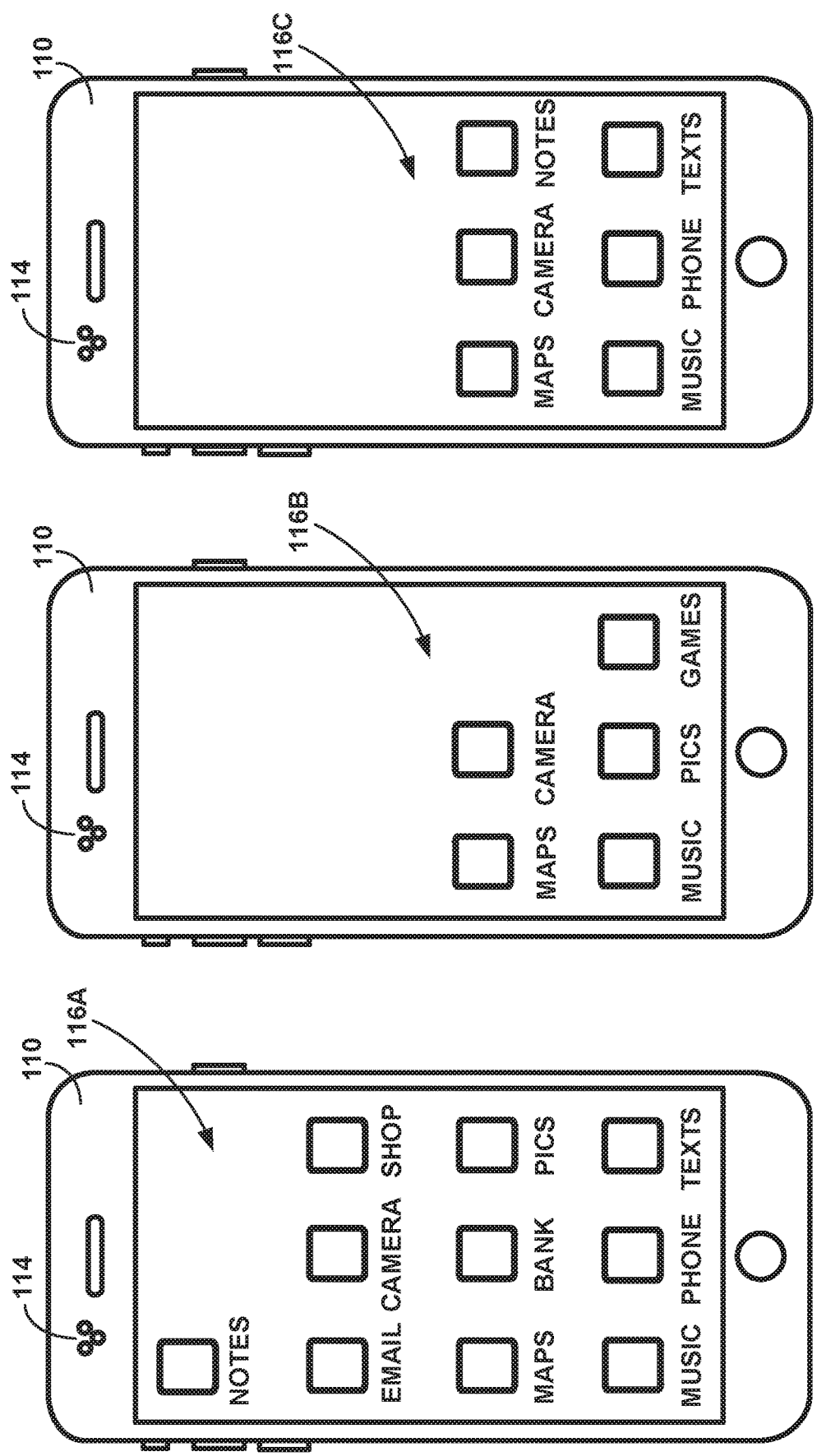
FIGS. 2A-2C depict the computing device of FIG. 1 with different depicted sets of functionality as associated with different facial expression conceptualizations.

For example, FIGS. 2A-2C depict different examples of computing device 110 with different sets of available functionality that are each associated with different facial expressions of authorized user 120. Though computing device 110 is depicted as a smart phone with front-facing set of cameras 114 for purposes of illustration, as described above, computing device 110 may be any form of computing device that is capable of being unlocked or used via facial scanning data, and/or computing device 110 may be a different form of a smart phone. For example, though front-facing cameras 114 are depicted in FIGS. 2A-2C for purposes of illustration, in other examples, cameras 114 may be back-facing cameras, or there may only be a single camera that is used, or the like.

As depicted in FIGS. 2A-2C, controller 112 may change what functionality is provided by computing device 110 by providing different sets of applications 116A-116C (hereinafter referred to as "sets of applications 116"). For example, controller 112 may detect that facial scanning data of first facial expression matches a predetermined facial expression that corresponds to full functionality of computing device 110. In response to this determination, controller 112 may cause computing device 110 to unlock a set of applications 116A that corresponds to full functionality of computing device 110 (e.g., such that no functionality of computing device 110 is unavailable to authorized user 120).

In some examples, controller 112 may cause computing device 110 to unlock and/or otherwise provide full functionality by set of applications 116A in response to authorized user 120 providing a normal facial expression. A normal facial expression may include a facial expression that authorized user 120 consistently provides throughout a daily life of authorized user 120. For example, a normal facial expression may include a resting facial expression, which is to say an expression that a face of authorized user 120 defines when authorized user 120 is not actively smiling, talking, or otherwise using their facial muscles to move and/or contort their face. For another example, a normal facial expression may include a natural smile of authorized user 120, which is to say the smile that authorized user 120 naturally and consistently makes. In other examples, as used herein, a "normal" facial expression may be referred to as a "default"

expression within expression corpus 130. As used herein, a normal facial expression and a default expression may be used interchangeably.

In certain examples, controller 112 may cause computing device 110 to unlock and/or otherwise provide most but not a full functionality in response to authorized user 120 providing a normal facial expression. For example, computing device 110 may store some particularly secure data or application, such as a password protector application that manages a set of secure passwords for all software applications provided on computing device 110. Controller 112 may be configured to only provide access to this particularly secure data or application in response to a facial expression that is atypical (e.g., not normal or not the default facial expression as used above, or otherwise not consistently provided by authorized user 120). By requiring certain particularly secure data/functionality to be accessed in response to an atypical facial expression known by authorized user 120, controller 112 may increase a security of such secure data/functionality.

As described herein, controller 112 may also be configured to provide a different set of functionality through a different facial expression. For example, as depicted in FIG. 2B, authorized user 120 may define a first predetermined facial express, such a winking facial expression, or a facial expression with a raised eyebrow, or the like. Authorized user 120 may have defined this expression in response to a specific situation, such as a child asking to use computing device 110. Controller 112 may receive facial scanning data of authorized user 120 when authorized user 120 is making this face, compare it to predetermined facial expressions of expression corpus 130, and cause computing device 110 to provide a functionality of a "child-friendly mode." For example, this may include set of applications 116B that is reduced from set of applications 166A (e.g., such that less than all functionality of computing device 110 is provided). Specifically, as depicted in FIG. 2B, controller 112 may cause computing device 110 to not provide access to a picture application, an email application, a note taking application, a shopping application, a banking application, a texting application, and a calling application.

In some examples, even where much functionality is reduced, some other functionality may be added in response to a predetermined facial expression. For example, as depicted in FIG. 2B, set of applications 116B includes a game application as part of the child-friendly mode that is not provided with set of application 116A in response to detecting a normal facial expression.

Authorized user 120 may set up controller 112 and computing device 110 by selecting which functionality to assign to what facial expressions, where functionality as described herein includes operations that computing device 110 does in response to a command from authorized user 120 (e.g., hiding an application, presenting an application) as well as other operations that authorized user 120 may be unable to do (e.g., spoof some functionality of an application, or spoof some data to replace current local data of computing device 110). For example, controller 112 may provide a process whereby authorized user 120 may select different applications that controller 112 is to cause computing device 110 to provide in response to a normal facial expression, which applications are child friendly that controller 112 is to cause computing device 110 to provide in response to a first predetermined facial expression, which applications include sensitive or particularly important data or functionality that controller 112 is to cause computing device 110 to provide in response to a second predetermined facial expression, etc.

Authorized user 120 may provide (e.g., make with their face) each of these facial expressions to controller 112 using camera 114 to define them as predetermined facial expressions. In some examples, controller 112 may instruct authorized user 120 to make each of these predetermined facial expressions a threshold number of times to determine a statistical baseline. Put differently, given that each time that a human makes an expression there may be some number of small deviations when compared to previous times making that expression due to the natural vagaries of human movement, controller 112 may capture a sufficient set of input images for each predetermined facial expression such that controller 112 may thereinafter have at least a certain confidence score whether or not a facial expression of authorized user 120 matches one of these previously provided predetermined facial expressions. Controller 112 can identify (and then maintain) this baseline through any number of data handling techniques, such as with an error-correcting code (ECC) technique.

In some examples, controller 112 may provide some sets of functionality in response to a facial expression that was not specifically programmed by authorized user 120. For example, controller 112 may be configured to detect if authorized user 120 is feeling one or more emotions, and may therein provide different sets of functionality in response to these detected emotions. Controller 112 may determine if authorized user 120 is feeling an emotion by one or more facial recognition techniques and/or emotion analyzing techniques known in the art, therein detecting whether or not authorized user 120 is, for example, scared, alarmed, surprised, sad, happy, excited, or the like based on, for example, pupil dilation, relative spacing between eyes and eyebrows, mouth shape, or the like.

For example, controller 112 may detect that received a facial expression indicates that authorized user 120 is scared, alarmed, angry, or some other emotion. For example, a malicious third party may steal computing device 110 from authorized user 120, and may then present camera 114 of computing device 110 to authorized user 120 as the malicious third party runs away. As camera 114 gains an image of authorized user 120, authorized user 120 may thus be angry and scared, such that facial scanning data of authorized user 120 depicts a facial expression that reflects these emotions.

Controller 112 may detect these emotions by comparing facial scan data to an established baseline face data (e.g., the normal face of authorized user 120), identifying irregularities in the facial scan data (e.g., pupils too big for the brightness, mouth open, eyebrows raised, etc.), and categorizing this as one or more emotional states. In some examples, controller 112 may utilize one or more machine learning techniques to improve at an act of categorizing emotional states over time. For example, controller 112 may categorize facial determinations over time and therein change and/or reduce functionality accordingly, and therein receive direct or indirect feedback from authorized user 120 (e.g., direct feedback in the form of changing settings of controller 112, or indirect feedback in the form of unlocking more functionality of computing device 110 where some functionality was not provided).

In response to such a determination, controller 112 may cause computing device 110 to provide a different (e.g., reduced) set of functionality such as with set of applications 116C. In some examples, controller 112 may only provide a reduced set of functionality when controller 112 determines that an emotion is sufficiently strong enough (e.g., only when authorized user 120 is furious rather than annoyed). As depicted in FIG. 2C, controller 112 may cause computing device 110 to provide functionality that does not include sensitive data or applications (e.g., such as providing a map application, camera application, and music application, as depicted in FIG. 2C), while hiding functionality and/or data that does include sensitive data (e.g., such as a bank application, picture gallery application, email application, shopping application, or the like). In some examples, this reduced set of functionality may further include a reduced ability to change security settings, such that no or reduced access is given to change a password or to input a new face that can unlock the phone, or the like. The reduced set of functionality may also include a reduced ability to access a cloud storage space associated with authorized user 120.

Controller 112 may cause computing device 110 to provide this reduced set of functionality in a manner that does not indicate that there is some functionality of computing device 110 that is not provided. Rather, when controller 112 causes computing device 110 to provide a reduced set of functionality, controller 112 may cause computing device 110 to provide this reduced set of functionality as if this is the only functionality that computing device 110 is capable of providing when fully unlocked. Put differently, when viewing computing device 110 after computing device 110 is unlocked at a time when controller 112 is causing computing device 110 to provide a reduced set of functionality (e.g., with set of applications 116C), a user may not be immediately aware that some functionality is not provided.

In certain examples, controller 112 may spoof some functionality of computing device 110 in response to detecting an emotion and/or predetermined facial expression. For example, controller 112 may cause computing device 110 to provide false texts, or false notes, or false pictures as part of spoofing functionality (e.g., such that computing device 110 does not provide the actual texts/notes/pictures as received/sent/generated by authorized user 120, but instead includes stock pictures, computer generated texts, random notes, or the like). Causing computing device 110 to spoof this functionality may improve an ability of controller 112 to make computing device 110 appear as if computing device 110 is unlocked in a normal state (e.g., as a malicious third party may find it suspicious if there is no texting application available) even as controller 112 protects data of authorized user 120 (e.g., by hiding any personal data that may be within text application).

In some examples, controller 112 may cause computing device 110 to spoof a changed and/or impaired nature of some functionality. For example, authorized user 120 may be using computing device 110 when a child comes up and asks to use a gaming application that requires a relatively large amount of streaming data on computing device 110. Authorized user 120 may know that the child may not pay attention to whether or not computing device 110 is connected to a secure wi-fi network. As such, authorized user 1120 may have set up a predetermined facial network that controller 112 detects to cause computing device 110 to only provide that gaming application when computing device 110 is connected to a secure wi-fi network, and/or that blocks certain functions of gaming applications that require large amounts of data streaming if computing device 110 is not connected to a secure wi-fi network. Similarly, controller 112 may be configured to cause computing device 110 to block and/or provide different functions based on different predetermined facial expressions that authorized user 120 set up, e.g., based on how old the requesting child is. For example, as set up by authorized user 120, one set of functionality may only enable pictures and/or videos of a certain size to be captured when computing device 110 is requested by a youngest child that is only 4 years old, and a second set of functionality as set up for when computing device 110 is requested by an older child that is 10 years old may enable pictures and/or videos of a relatively larger size to be captured. Similar functionality may enable authorized user 120 to set up different sets of functionalities that controller 112 can cause computing device 110 to provide for children of different ages, such as movies/songs that authorized user 120 has different for the different ages.

In other examples, controller 112 may be configured to delete some particularly sensitive data in response to detecting a predetermined facial expression and or a particular emotion (e.g., in response to determining that authorized user 120 is raising a single eyebrow a threshold amount, or that authorized user 120 is expressing anger at more than a threshold severity). Controller 112 may only delete a local store of this sensitive data. In some examples, controller 112 may further send this sensitive data to a predetermined location (e.g., such as an email address or location in a cloud network) prior to deleting it, such that the sensitive data is both available for authorized user 120 in the future as well as not available to a malicious third party in the present.

Controller 112 may further be configured to send one or more messages to an external location in response to detecting a predetermined facial expression and/or emotion. For example, if controller 112 detects that authorized user 120 is particularly scared, controller 112 may be configured to send a warning message that includes a location of computing device 110 to an external party or to authorities or the like. In some examples, controller 112 may cause computing device 110 to require two-factor authentication in response to detecting a first predetermined facial expression or emotion, even as controller 112 is also configured to cause computing device 110 to fully unlock in response to a second predetermined facial expression.

Figure 3:
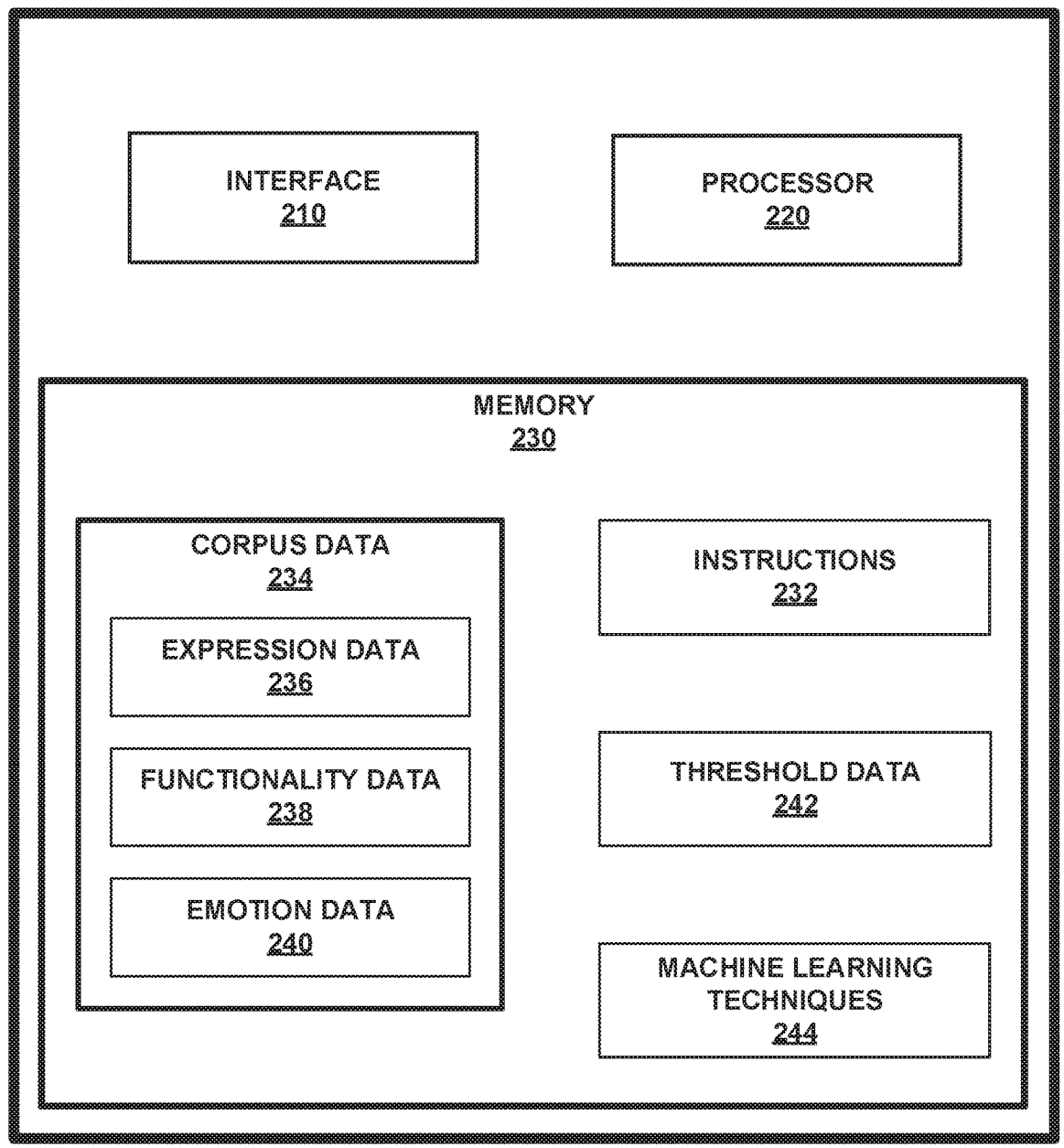
FIG. 3 depicts a conceptual box diagram of example components of the controller of FIG. 1.

As described above, controller 112 may include or be part of a computing system that includes a processor configured to execute instructions stored on a memory to execute the techniques described herein. FIG. 3 is a conceptual box diagram of such computing system 200. In some examples, computing system 200 may be functionally equivalent to computing device 110. While computing system 200 is depicted as a single entity (e.g., within a single housing) for the purposes of illustration, in other examples, controller 112 may comprise two or more discrete physical systems (e.g., within two or more discrete housings). Computing system 200 may include interface 210, processor 220, and memory 230. Computing system 200 may include any number or amount of interface(s) 210, processor(s) 220, and/or memory(s) 230.

Computing system 200 may include components that enable controller 112 to communicate with (e.g., send data to and receive and utilize data transmitted by) devices that are external to controller 112. For example, computing system 200 may include interface 210 that is configured to enable controller 112 and components within computing system 200 (e.g., such as processor 220) to communicate with entities external to computing system 200. Specifically, interface 210 may be configured to enable controller 112 to communicate with expression corpus 130, or the like. Interface 210 may include one or more network interface cards, such as Ethernet cards and/or any other types of interface devices that can send and receive information. Any suitable number of interfaces may be used to perform the described functions according to particular needs.

As discussed herein, controller 112 may be configured to cause computing device 110 to provide different sets of functionality in response to different facial expressions and/or emotions. Controller 112 may utilize processor 220 to thusly manage computing device functionality. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to manage functionality.

Processor 220 may manage functionality of computing device 110 according to instructions 232 stored on memory 230 of controller 112. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may manage computing device 110 functionality as described herein according to instructions 232 of one or more applications (e.g., software applications) stored in memory 230 of computing system 200.

In addition to instructions 232, in some examples gathered or predetermined data or techniques or the like as used by processor 220 to manage functionality of computing device 110 per different detected facial expressions and/or emotions as described herein may be stored within memory 230. For example, memory 230 may include information described above from expression corpus 140. For example, as depicted in FIG. 3, memory 230 may include corpus data 234. Corpus data 234 may include data on settings, factors, baselines, or the like that controller 112 uses to manage functionality of computing device 110 as described herein. For example, corpus data 234 may include facial expression data 236. Facial expression data 236 may include a list of all predetermined facial expressions for each authorized user 120, and baselines thereof (where a baseline is an allowable amount of deviation within which controller 112 still characterizes facial scanning data as matching a predetermined facial expression). Corpus data 234 may further include emotion data 240, which may include data points that indicate emotions of a user. Emotion data 240 may be calculated from a baseline of a face of authorized user 120, such as from a normal expression of authorized user 120 as described herein.

In some examples, both predetermined facial expressions of expression data 236 and emotions of emotion data 240 may be correlated to a different set of functions of computing device. These sets of functions may be stored in functionality data 238 of corpus data. As described above, authorized user 120 may have access to these correlations, and may save and/or alter how controller 112 changes sets of functionalities computing device 110 provides in response to detecting different predetermined expressions and/or emotions.

Further, memory 230 may include threshold data 242. Threshold data 242 may include thresholds that define how strong a threshold must be before controller 112 determines that certain emotions and/or predetermined facial expressions are detected. In some examples, thresholds as stored within threshold data 242 may be different for different sets of functionalities. For example, threshold data 242 may have a relatively low (e.g., relatively easy to satisfy) threshold for switching between various normal states of computing device 110 (e.g., a gaming mode, a study mode, a normal mode, a work mode), while threshold data 242 may define a relatively high (e.g., a relatively hard to satisfy) threshold for activating different (e.g., more critical) sets of functionalities, such as functionalities that include deleting data, notifying authorities, or the like.

Memory 230 may further include machine learning techniques 242 that controller 112 may use to improve a process of manage functionality of computing device as discussed herein over time. Machine learning techniques 242 can comprise algorithms or models that are generated by performing supervised, unsupervised, or semi-supervised training on a dataset, and subsequently applying the generated algorithm or model to manage functionality. Using these machine learning techniques 242, controller 112 may improve an ability of determining when authorized user 120 is assuming a predetermined facial expression, and/or when authorized user 120 is experiencing an emotion that is associated with a reduced set of functionality.

Machine learning techniques 242 can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Specifically, machine learning techniques 242 can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning algorithms.

Figure 4:
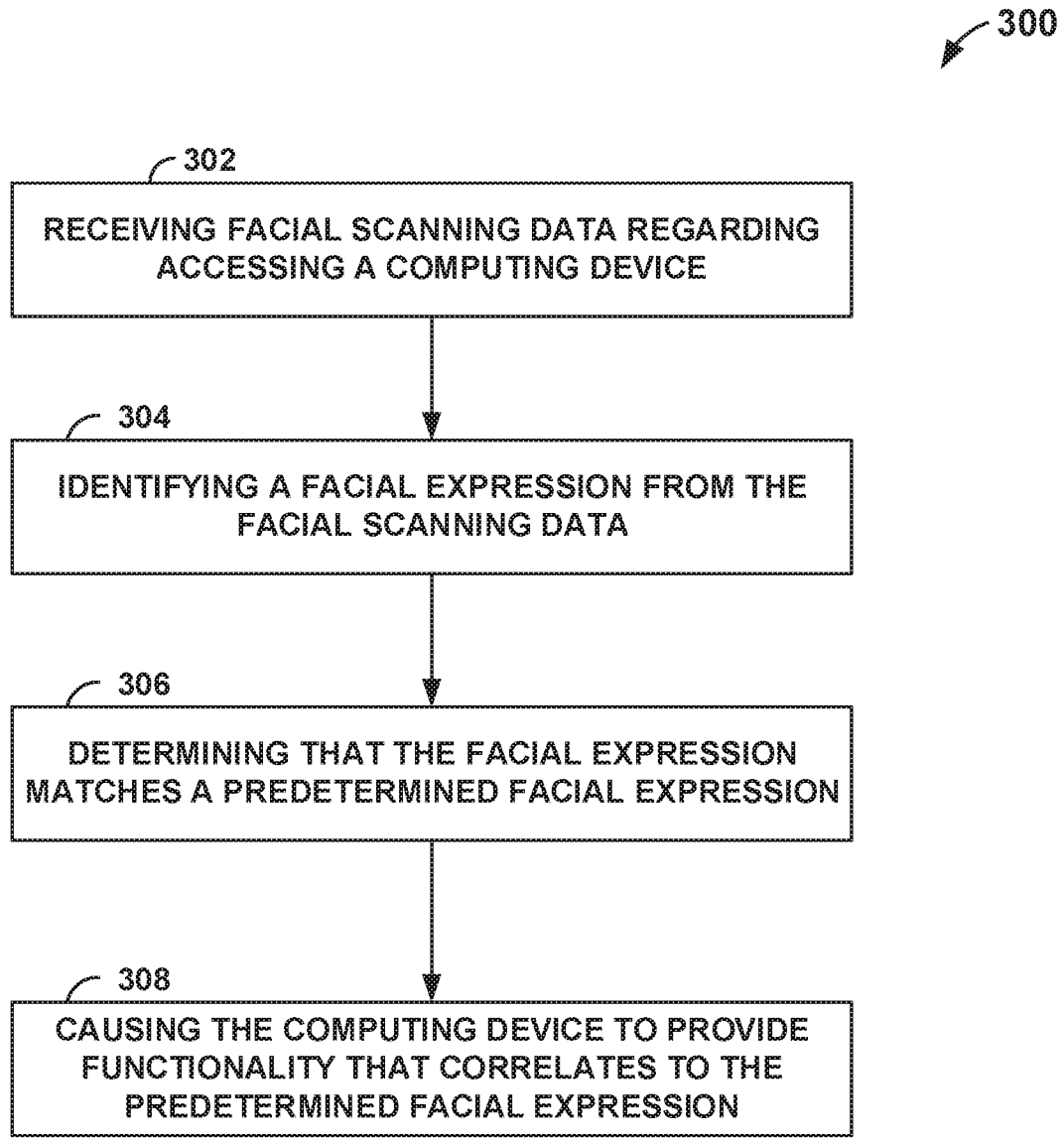
FIG. 4 depicts an example flowchart by which the controller of FIG. 1 may manage functionality of a computing device via facial scanning data.

Using these components, controller 112 may manage functionality of computing device 110 using facial scanning data as discussed herein. For example, controller 112 may manage functionality of computing device 110 according to flowchart 300 depicted in FIG. 4. Flowchart 300 of FIG. 4 is discussed with relation to FIG. 1 for purposes of illustration, though it is to be understood that other systems may be used to execute flowchart 300 of FIG. 4 in other examples. Further, in some examples controller 112 may execute a different method than flowchart 300 of FIG. 4, or controller 112 may execute a similar method with more or less steps in a different order, or the like.

Controller 112 receives facial scanning data regarding an attempt to access computing device 110 (302). For example, authorized user 120 may be attempting to access computing device 110, or a malicious third party may be attempting to access computing device 110. Controller 112 may receive facial scanning data as gathered by camera 114.

Controller 112 identifies a facial expression from the facial scanning data (304). For example, controller 112 may identify the face from the facial scanning data, and may identify the points of a face that are unique (e.g., controller 112 may isolate the shape of and distance between features). Controller 112 may use any facial recognition technique known in the art to identify the face and therein identify the facial expression of authorized user 120.

Controller 112 determines that the facial expression of the facial scanning data matches a predetermined facial expression (306). Controller 112 may determine that the facial expression of the facial scanning data matches the predetermined facial expression with at least a threshold amount of confidence (e.g., as measured by a confidence score). If controller 112 is not able to verify that the facial expression of the facial scanning data matches the predetermined facial expression with at least the threshold amount of confidence, controller 112 may cause computing device 110 to request an additional facial scan, continue gathering facial scanning data via camera 114, cause computing device 110 to indicate a failure, or the like.

Controller 112 causes computing device 110 to provide a set of functionality that correlates to the predetermined facial expression (308). The predetermined facial expression may correlate to relatively more functionality, less functionality, more sensitive functionality, or the like. For example, when going into work, authorized user 120 may provide a first facial expression (such that the authorized user 120 causes her face to purposefully make this expressions) that correlates to showing a work email and work chatting application, while hiding a gaming application and muting one or more text conversations. When heading home, authorized user 120 may then provide a second facial expression that correlates to hiding the work email and chatting application and providing the gaming application and previously muted text conversations.

In some examples, controller 112 may cause computing device 110 to autonomously execute some other functions in response to a predetermined facial expression or emotion. For example, controller 112 may cause computing device 110 to send an outgoing message, delete some local data (e.g., deleting one or saved passwords, or deleting a software application), require two-factor authentication to generally unlock or otherwise gain access to functions of computing device 110, or the like.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
receiving first facial scanning data of an authorized user regarding a first requested access to a computing device;
identifying that a first facial expression of the first facial scanning data matches a first predetermined facial expression of a plurality of predetermined facial expressions and is a normal facial expression of the user;
causing the computing device to provide a first set of functionality associated with the first predetermined facial expression in response to identifying that the first facial expression matches the first predetermined facial expression;
receiving second facial scanning data of the authorized user regarding a second requested access to the computing device;
identifying that a second facial expression of the second facial scanning data matches a second predetermined facial expression of a plurality of predetermined facial expressions with at least a first threshold amount of confidence;
causing the computing device to provide a second set of functionality associated with the second predetermined facial expression in response to identifying that the second facial expression matches the second predetermined facial expression, wherein the second set of functionality includes a work mode in which certain text threads are muted;
receiving third facial scanning data of the authorized user regarding a third requested access to the computing device;
identifying that the third facial expression of the third facial scanning data matches a third predetermined facial expression of the plurality of predetermined facial expressions with at least a second threshold amount of confidence, wherein the second threshold amount of confidence is higher than the first threshold amount of confidence;
causing the computing device to provide a third set of functionality associated with the third predetermined facial expression in response to identifying that the third facial expression matches the third predetermined facial expression, wherein the third set of functionality includes:
identifying sensitive data on a local store of the computing device;
transmitting this sensitive data to a predetermined remote location; and
deleting the local store of this sensitive data;
receiving fourth facial scanning data of the authorized user regarding a fourth requested access to the computing device;
identifying that a fourth facial expression of the fourth facial data matches a fourth predetermined facial expression of the plurality of predetermined facial expressions, wherein the fourth facial expression is an atypical facial expression of the user; and
causing the computing device to provide a fourth set of functionality associated with the fourth predetermined facial expression in response to identifying that the fourth facial expression matches the fourth predetermined facial expression, wherein the fourth set of functionality includes less functionality than the first set of functionality.

2. The computer-implemented method of claim 1, wherein the computing device provides each of the first and second and third and fourth sets of functionality without indicating whether the computing device is providing either the first or second or third or fourth set of functionality.

3. The computer-implemented method of claim 1, wherein the third set of functionality includes requiring two-factor authentication to gain access to the computing device and the first set of functionality does not include requiring two-factor authentication to gain access to the computing device.

4. The computer-implemented method of claim 1, wherein the third set of functionality includes automatically generating an outgoing message to a predetermined location.

5. The computer-implemented method of claim 1, wherein the fourth set of functionality includes spoofing functionality of the computing device.

6. The computer-implemented method of claim 1, wherein the third set of functionality includes hiding some data of the computing device.

7. A system comprising:
a processor; and
a memory in communication with the processor, the memory containing instructions that, when executed by the processor, cause the processor to:
receive first facial scanning data of an authorized user regarding a first requested access to a computing device;
identify that a first facial expression of the first facial scanning data matches a first predetermined facial expression of a plurality of predetermined facial expressions and is a normal facial expression of the user;
cause the computing device to provide a first set of functionality associated with the first predetermined facial expression in response to identifying that the first facial expression matches the first predetermined facial expression;
receive second facial scanning data of the authorized user regarding a second requested access to the computing device;
identify that a second facial expression of the second facial scanning data matches a second predetermined facial expression of a plurality of predetermined facial expressions with at least a first threshold amount of confidence;
cause the computing device to provide a second set of functionality associated with the second predetermined facial expression in response to identifying that the second facial expression matches the second predetermined facial expression, wherein the second set of functionality includes a work mode in which certain text threads are muted;
receive third facial scanning data of the authorized user regarding a third requested access to the computing device;
identify that the third facial expression of the third facial scanning data matches a third predetermined facial expression of the plurality of predetermined facial expressions with at least a second threshold amount of confidence, wherein the second threshold amount of confidence is higher than the first threshold amount of confidence;

cause the computing device to provide a third set of functionality associated with the third predetermined facial expression in response to identifying that the third facial expression matches the third predetermined facial expression, wherein the third set of functionality includes:
identify sensitive data on a local store of the computing device;
transmit this sensitive data to a predetermined remote location; and
delete the local store of this sensitive data;
receive fourth facial scanning data of the authorized user regarding a fourth requested access to the computing device;
identify that a fourth facial expression of the fourth facial data matches a fourth predetermined facial expression of the plurality of predetermined facial expressions, wherein the fourth facial expression is an atypical facial expression of the user; and
cause the computing device to provide a fourth set of functionality associated with the fourth predetermined facial expression in response to identifying that the fourth facial expression matches the fourth predetermined facial expression, wherein the fourth set of functionality includes less functionality than the first set of functionality.

8. The system of claim 7, wherein the computing device provides each of the first and second and third and fourth set of functionality without indicating whether the computing device is providing either the first or second or third or fourth set of functionality.

9. A computer program product, the computer program product comprising a computer readable storage medium having program instructions embodied therewith, the program instructions executable by a computer to cause the computer to:
receive first facial scanning data of an authorized user regarding a first requested access to a computing device;
identify that a first facial expression of the first facial scanning data matches a first predetermined facial expression of a plurality of predetermined facial expressions and is a normal facial expression of the user;
cause the computing device to provide a first set of functionality associated with the first predetermined facial expression in response to identifying that the first facial expression matches the first predetermined facial expression;
receive second facial scanning data of the authorized user regarding a second requested access to the computing device;
identify that a second facial expression of the second facial scanning data matches a second predetermined facial expression of a plurality of predetermined facial expressions with at least a first threshold amount of confidence;
cause the computing device to provide a second set of functionality associated with the second predetermined facial expression in response to identifying that the second facial expression matches the second predetermined facial expression, wherein the second set of functionality includes a work mode in which certain text threads are muted;
receive third facial scanning data of the authorized user regarding a third requested access to the computing device;
identify that the third facial expression of the third facial scanning data matches a third predetermined facial expression of the plurality of predetermined facial expressions with at least a second threshold amount of confidence, wherein the second threshold amount of confidence is higher than the first threshold amount of confidence;
cause the computing device to provide a third set of functionality associated with the third predetermined facial expression in response to identifying that the third facial expression matches the third predetermined facial expression, wherein the third set of functionality includes:
identify sensitive data on a local store of the computing device;
transmit this sensitive data to a predetermined remote location; and
delete the local store of this sensitive data;
receive fourth facial scanning data of the authorized user regarding a fourth requested access to the computing device;
identify that a fourth facial expression of the fourth facial data matches a fourth predetermined facial expression of the plurality of predetermined facial expressions, wherein the fourth facial expression is an atypical facial expression of the user; and
cause the computing device to provide a fourth set of functionality associated with the fourth predetermined facial expression in response to identifying that the fourth facial expression matches the fourth predetermined facial expression, wherein the fourth set of functionality includes less functionality than the first set of functionality.

* * * * *